Patented Mar. 28, 1944

2,345,010

UNITED STATES PATENT OFFICE 2,345,010

AZO DYE

George W. Seymour and Victor S. Salvin, Cumberland, Md., assignors to Celanese Corporation of America, a corporation of Delaware No Drawing. Application March 26, 1941, Serial No. 385,244

8 Claims. (Cl. 260—158)

This invention relates to azo dyestuffs, and relates more particularly to dischargeable azo dyestuffs which may be used for dyeing organic derivative of cellulose materials.

An object of this invention is the preparation of azo dyestuffs which may be used for dying textile materials, and particularly those materials made of or containing organic derivatives of cellulose.

Another object of this invention is the preparation of dischargeable azo dyestuffs which are fast to light, resistant to acid fading and which do not bleed from the materials dyed therewith.

Other objects of this invention will appear from the following detailed description.

Azo dyestuffs are well-suited to the dyeing of many textile materials. In applying many of these dyestuffs, it has been found that they frequently are not fast to light, that they fade when exposed to an acid atmosphere or that they cannot be discharged to pure white color when subjected to a discharging process. In addition, it has also been found that many of these dyestuffs tend to bleed off, even in a dry state, when placed in contact with white materials, even for short periods of time. While some dyestuffs are better in some respects than in others, few, if any, have been found wholly acceptable and entirely free of all of these undesirable characteristics.

We have now discovered that azo dyestuffs which are fast to light and acid fading, free from dry bleeding and dischargeable to pure whites may be obtained by diazotizing an amino compound of the following general formula:

wherein Z represents a benzene or benzo-thiazole nucleus, $n$ is at least 1 and X, which may be the same or different substituents when $n$ is greater than 1, represents an $NO_2$, O-alkyl and $SO_2$-alkyl group, and where Z is a benzothiazole nucleus the amino group is in the thiazole ring. The said diazotized amino compound is then coupled with a substituted di-hydroxyalkyl-amino compound of the following general formula:

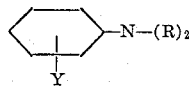

wherein R is an hydroxyalkyl group containing at least two carbon atoms and Y may be an acylamino group, a halogen or an alkyl group. Preferably, when X is an $SO_2$-alkyl group and Y is an acylamino group, said acyl group should contain at least three carbon atoms.

By employing azo dyestuffs of this group in connection with the dyeing of textile material made of or containing organic derivatives of cellulose, such as cellulose acetate, it is possible to obtain these materials dyed in various shades of red, depending upon the components coupled, all of which colors are extremely fast to light and acid, are dischargeable, and will not dry bleed on to white fabrics.

The substituted amino compounds which may be used in accordance with our invention are amines such as, for example 2-methoxy-4-nitroaniline, 5-nitro-2-amino-phenyl-methyl-sulfone, 5-nitro-2-amino-phenyl-ethyl-sulfone, 2-ethoxy-4-nitro-aniline, 6-methoxy-2-amino-benzo - thiazole, 2-amino-benzo-thiazole, 6-ethoxy-2-amino-benzo-thiazole, and other substituted amino compounds. The di-hydroxyalkyl-amino coupling compounds with which the diazotized amino compound may be coupled to produce the desired diazo dyestuffs fast to light and acid fading and resistant to dry bleeding may be, for example, 1-di-hydroxyethyl-amino-3-acetanilide, 1-di-hydroxyethyl-amino-3-chloro-benzene, di-hydroxyethyl-meta-toluidine, 1-di-hydroxypropyl-amino-3-propionyl-amino-benzene, 1-di-hydroxypropyl-amino-3-chloro - benzene, 1-di-hydroxypropyl-3-ethyl-benzene and 1-di-($\beta$-$\gamma$-hydroxy propyl)-acetanilide.

The dyes may be formed in substance and the fabric may be dyed directly in a bath containing the desired amount of dyestuff dispersed therein by means of a suitable detergent or dispersing agent, or else the fabric which is to be dyed may be based with the amino compound and the coupling carried out on the fabric itself. The amino compound may be applied to the fabric in the form of dispersions, or by bath or mechanical impregnation methods, such as padding or printing. After the amino compound has been applied to the fabric, the based fabric may be diazotized in the usual manner using sodium nitrite and sulphuric or hydrochloric acid. It is preferable that the diazotization be carried out at a low temperature, preferably below 20° C. The diazotization may be carried out on a winch or jig or in any other suitable mechanism for working the material. The coupling reaction may then be carried out by entering the diazotized fabric in a bath containing the coupling component. The fabric may be entered into a cold coupling bath which may then be heated, or the fabric may be entered into a bath already heated to about the desired coupling temperature. When the coupling is completed the dyed fabric is scoured, rinsed and dried.

The azo dyestuffs of our invention may be used for the dyeing of various naturally occurring textile materials such as cotton, silk, and wool but are especially suitable for dyeing textile materials made of or containing organic derivatives of cellulose such as cellulose esters and cellulose ethers. Examples of cellulose esters are cellulose acetate, cellulose propionate, cellulose butyrate, and mixed esters such as cellulose acetate-propionate and cellulose acetate-butyrate, while examples of cellulose ethers are ethyl cellulose and benzyl cellulose.

When the dyestuffs are produced in substance they may also be employed for coloring solutions of cellulose derivatives, especially lacquers and spinning solutions. By shaping and setting such solutions in the form of filaments, straws, films and the like, valuable colored products can be obtained. For example, colored organic derivative of cellulose filaments may be produced by dry spinning such colored solutions.

In order further to illustrate our invention but without being limited thereto the following examples are given:

Example I 18 parts of 6-methoxy-2-amino-benzo-thiazole are dissolved in a mixture of 50 parts of water and 18 parts of formic acid at 40° C. The solution is cooled and added to a cold mixture of 50 parts water and 50 parts concentrated $H_2SO_4$. The amino-benzothiazole is thus precipitated in the form of its sulfate in a thick slurry. This paste is cooled to −5 to −10° C., and a solution of 7.1 parts sodium nitrite and 30 parts of water are added dropwise with stirring. The orange diazo solution is stirred at −10° for 1 hour, when only a trace of nitrous acid will remain. 24 parts of 1-dihydroxy-ethyl-amino-3-acetanilide are dissolved in 200 parts of ice and water. The diazonium solution may be added directly and rapidly to this solution. The coupling is rapid. A purple salt of the dyestuff is formed. A 10% sodium acetate solution is added to reduce the mineral acidity. Although coupling is rapid, the solution is stirred for 2 hours to assure complete reaction. The precipitated dyestuff is then removed by filtration and may be washed with water.

A cellulose acetate fabric is then dyed with 2.0% of the dyestuff prepared as above, suitably dispersed in a dye bath. This bath dyes the cellulose acetate fabric a deep magenta. The dyed fabric is dischargeable to a pure white and is highly resistant to light and acid fading. When a portion of the dyed fabric is placed between two pieces of white cellulose acetate fabric and subjected to the pressure of a seven pound hand iron for ten minutes at 180° C., no staining of the white fabric due to dry bleeding of the dyestuff is observed.

Example II 21.7 parts of 5-nitro-2-amino-phenyl-methyl-sulfone are dissolved in 100 parts of concentrated sulfuric acid (sp. gr. 1.83) at 10° C. with stirring. The nitrosyl sulfuric acid is made by dissolving 7.2 parts of sodium nitrite in 75 parts of concentrated sulfuric acid at 60° C. This solution is cooled to 10° C. and added to the sulfuric acid solution of the dyestuff, also at 10° C. The mixture is stirred for ½ hour, during which time the temperature is allowed to rise spontaneously to 15° C. 125 parts of glacial acetic acid are then added and stirring is continued for 1 hour. At the end of this time, 5 parts of urea are added to decompose the excess nitrous acid. Coupling is carried out by dissolving 20 parts of 1-dihydroxy-ethyl-amino-3-methyl-benzene in 400 parts of ice and water. 25 parts of concentrated HCl are added. At 0° C., the diazonium solution of the 5-nitro-2-amino-phenyl-methyl-sulfone is added over a period of 20 minutes. The 10% solution of sodium acetate is added concurrently to accelerate coupling and to reduce the acidity. The mixture is stirred for 2 hours at less than 5° C., then filtered cold and washed with water.

A cellulose acetate fabric is then dyed in a suitable dye bath with 2.0% of the azo dyestuff thus obtained, yielding a fabric dyed a purplish maroon. The dyed fabric is fast to light and acid fading and may be discharged to pure white. When a portion of this dyed fabric is placed between two pieces of white cellulose acetate fabric and subjected to the dry bleeding test set out in Example I, no staining of the white fabric is observed.

Example III 17 parts of 5-nitro-2-amino-anisole are stirred in a mixture of 40 parts of concentrated HCl (sp. gr. 1.18) and 60 parts of water at 40° C. A fine slurry is formed, then 500 parts of ice and water are added. 7.1 parts of sodium nitrite in 40 parts of water are added to the suspension in 15 minutes. Temperature should not rise above 5° C. Evidence of complete reaction is that the solid has passed into solution. The solution is stirred for 1 hour until starch iodide papers show only a trace of nitrous acid. 24 parts of 1-dihydroxy-ethyl-amino-3-acetanilide is dissolved in 600 parts of water containing ice. The diazotized solution of 5-nitro-2-amino-anisole is added to the stirred solution. A 10% solution of sodium acetate is added concurrently. The dyestuff forms immediately as an orange red precipitate, yet the dyestuff suspension is stirred for two hours to insure completeness of reaction. Care is usually taken to have a slight excess of the developer present in order to assure maximum yield from the anisole. The dyestuff is isolated by filtration, and the filter cake washed with water.

A cellulose acetate fabric is dyed in a suitable dye bath with 2.0% of the azo dyestuff thus obtained, yielding a fabric dyed a dark red shade. This dyed fabric is likewise highly resistant to light and acid fading and may be discharged to a pure white. When this dyed fabric is tested for dry bleeding with white fabrics in the manner set forth, no staining whatsoever of the white fabric is observed.

Example IV 14 parts para-nitro-aniline are dissolved in 30 parts HCl (sp. gr. 1.18). 60 parts of water are added at 60° C. The solution is poured into 500 parts of water and ice with stirring so that a fine suspension is obtained. 7.1 parts of sodium nitrite are dissolved in 40 parts of water, and are added in 5 minutes. Usually, 1 hour is necessary for the reaction and the temperature is kept at 5° C. The end of the reaction is noted by a complete solution being obtained, and starch iodide paper shows only a trace of free nitrous acid. 24 parts of 1-dihydroxy-ethyl-amino-3-acetanilide dissolved in 600 parts of ice and water. The diazonium solution of para-nitro-aniline is added concurrently with a 10% solution of sodium acetate. The azo dyestuff forms as an orange precipitate. It is filtered and washed with cold water. The filter presscake is a reddish brown, and dyes cellulose acetate fabrics to a dep scarlet, which is highly resistant to dry bleeding, is of excellent fastness to acid fading and light and discharges to a pure white.

It is to be understood that the foregoing detailed description is merely given by way of example and that many variations may be made therein without departing from the spirit of our invention.

Having described our invention, what we desire to secure by Letters Patent is:

1. Process for the production of an azo dye, which comprises coupling a diazotized 6-methoxy-2-amino-benzthiazole with a 3-acyl-amino-1-di-hydroxyalkyl-amino-benzene.

2. Process for the production of an azo dye, which comprises coupling a diazotized 6-methoxy-2-amino-benzthiazole with 3-acetyl-amino-1-di-hydroxyethyl-amino-benzene.

3. A dyestuff prepared by coupling a diazotized 6-methoxy-2-amino-benzthiazole with a 3-acyl-amino-1-di-hydroxyalkyl-amino-benzene.

4. A dyestuff prepared by coupling a diazotized 6-methoxy-2-amino-benzthiazole with 3-acetyl-amino-1-di-hydroxyethyl-amino-benzene.

5. A process for the coloration of materials, which comprises applying to an organic derivative of cellulose material a dyestuff obtained by coupling a diazotized 6-methoxy-2-amino-benzthiazole with a 3-acyl-amino-1-di-hydroxyalkyl-amino-benzene.

6. A process for the coloration of materials, which comprises applying to a cellulose acetate material a dyestuff obtained by coupling a diazotized 6-methoxy-2-amino-benzthiazole with 3-acetyl-amino-1-di-hydroxyethyl-amino-benzene.

7. Organic derivative of cellulose material colored with a dyestuff prepared by coupling a diazotized 6-methoxy-2-amino-benzthiazole with a 3-acyl-amino-1-di-hydroxyalkyl-amino-benzene.

8. Cellulose acetate material colored with a dyestuff prepared by coupling a diazotized 6-methoxy-2-amino-benzthiazole with 3-acetyl-amino-1-di-hydroxyethyl-amino-benzene.

GEORGE W. SEYMOUR.
VICTOR S. SALVIN.